United States Patent
Sen et al.

(10) Patent No.: US 10,536,775 B1
(45) Date of Patent: Jan. 14, 2020

(54) AUDITORY SIGNAL PROCESSOR USING SPIKING NEURAL NETWORK AND STIMULUS RECONSTRUCTION WITH TOP-DOWN ATTENTION CONTROL

(71) Applicant: Trustees of Boston University, Boston, MA (US)

(72) Inventors: Kamal Sen, Boston, MA (US); Harry Steven Colburn, Jamaica Plain, MA (US); Junzi Dong, Cambridge, MA (US); Kenny Feng-Hsu Chou, Brookline, MA (US)

(73) Assignee: Trustees of Boston University, Boston, MA (US)

( * ) Notice: Subject to any disclaimer, the term of this patent is extended or adjusted under 35 U.S.C. 154(b) by 0 days.

(21) Appl. No.: 16/448,259

(22) Filed: Jun. 21, 2019

Related U.S. Application Data

(60) Provisional application No. 62/688,181, filed on Jun. 21, 2018.

(51) Int. Cl.
*H04R 3/04* (2006.01)
*H04R 3/00* (2006.01)
(Continued)

(52) U.S. Cl.
CPC ............ *H04R 3/04* (2013.01); *G10L 21/0208* (2013.01); *H04R 3/005* (2013.01); *H04R 5/04* (2013.01); *H04S 7/307* (2013.01); *H04S 2420/01* (2013.01)

(58) Field of Classification Search
CPC .. H04R 3/04; H04R 3/005; H04R 5/04; G10L 21/0208; H04S 7/307; H04S 2420/01
(Continued)

(56) References Cited

U.S. PATENT DOCUMENTS 7,149,320 B2   12/2006   Haykin et al.
9,020,870 B1    4/2015   Daily et al.
(Continued)

FOREIGN PATENT DOCUMENTS

WO   2015195954   12/2015

OTHER PUBLICATIONS

Bialek, William, et al. (1991) "Reading a neural code." Science Magazine, vol. 252, pp. 1854-1857.
(Continued)

*Primary Examiner* — William A Jerez Lora
(74) *Attorney, Agent, or Firm* — BainwoodHuang

(57) ABSTRACT

An auditory signal processor includes a filter bank generating frequency components of a source audio signal; a spatial localization network operative in response to the frequency components to generate spike trains for respective spatially separated components of the source audio signal; a cortical network operative in response to the spike trains to generate a resultant spike train for selected spatially separated components of the source audio signal; and a stimulus reconstruction circuit that processes the resultant spike train to generate a reconstructed audio output signal for a target component of the source audio signal. The cortical network incorporates top-down attentional inhibitory modulation of respective spatial channels to produce the resultant spike train for the selected spatially separate components of the source audio signal, and the stimulus reconstruction circuit employs convolution of a reconstruction kernel with the resultant spike train to generate the reconstructed audio output.

17 Claims, 7 Drawing Sheets

(51) Int. Cl.
*H04S 7/00* (2006.01)
*G10L 21/0208* (2013.01)
*H04R 5/04* (2006.01)

(58) Field of Classification Search
USPC .............................. 381/98, 124, 94.4, 94.3
See application file for complete search history.

(56) References Cited

U.S. PATENT DOCUMENTS

| | | | |
|---|---|---|---|
| 2006/0025989 A1* | 2/2006 | Mesgarani | G10L 21/0272 704/200 |
| 2007/0073538 A1* | 3/2007 | Rifkin | G06K 9/6286 704/236 |
| 2015/0036856 A1 | 2/2015 | Pruthi et al. | |

OTHER PUBLICATIONS

Dong, Junzi, et al., (2016) "Cortical Transformation of Spatial Processing for Solving the Cocktail Party Problem: A Computational Model." eNeuro, vol. 3, pp. 1-11.
Elhilali, Mounya, et al., (2009) "Temporal Coherence in the Perceptual Organization and Cortical Representation of Auditory Scenes." Neuron, vol. 61, pp. 317-329.
Fischer, Brian J., et al., (2009) "Multiplicative auditory spatial receptive fields created by a hierarchy of population codes." PLoS One vol. 4, Issue 11, pp. 24-26.
Jiang, Yi, et al., (2014) "Binaural Classification for Reverberant Speech Segregation Using Deep Neural Networks." IEEE/ACM Transactions on Audio, Speech, and Language Processing, vol. 22, pp. 2112-2121.
Krishnan, Lakshmi, et al., (2014) "Segregating Complex Sound Sources through Temporal Coherence." PLoS Computational Biology, vol. 10, Issue 12, pp. 1-10.
Maddox, Ross K., et al. (2012) "Competing sound sources reveal spatial effects in cortical processing." PLoS Biology, vol. 10, Issue 5.
Mandel, Michael I., et al., (2010) "Model-based expectation maximization source separation and localization." IEEE Transactions on Audio, Speech, and Language Processing, vol. 1, pp. 382-394.
Mesgarani, Nima, et al., (2012) "Selective cortical representation of attended speaker in multi-talker speech perception." Nature, vol. 485, pp. 233-236.
Mesgarani, Nima, et al., (2009) "Influence of context and behavior on stimulus reconstruction from neural activity in primary auditory cortex." J Neurophysiol, vol. 102 pp. 3329-3339.
Slaney, Malcolm (1998) "Auditory toolbox: A Matlab Toolbox for Auditory Modeling Work." Interval Research Corporation, Technical Report #1998-010.
Wang, Yuxuan, et al., (2014) "On training targets for supervised speech separation." IEEE/ACM Transactions on Audio, Speech, and Language Processing, vol. 22, No. 12, pp. 1849-1858.
Wirtzfeld, Michael Roy, "Predicting Speech Intelligibility and Quality From Model Auditory Nerve Fiber Mean-Rate and Spike-Timing Activity", a thesis by Michael Roy Wirtzfeld, Dec. 2016.
Baluch, Faran et al., "Mechanisms of Top-down Attention", Trends in Neurosciences, vol. 34, No. 4, Apr. 2011.

* cited by examiner

| | STOI Target Only | Subjective STOI (%) | PESQ | STOI + Masker | Subjective STOI (%) | PESQ |
|---|---|---|---|---|---|---|
| LR | 0.7131 | 94.2408 | 1.4872 | 0.5278 | 60.2432 | 1.4208 |
| SM1 | 0.8003 | 98.1667 | 1.5663 | 0.6258 | 83.7126 | 1.3755 |
| SM2 | 0.7288 | 95.3019 | 1.4282 | 0.601 | 78.6356 | 1.3063 |
| SM3 | 0.7377 | 95.9384 | 1.3048 | 0.5901 | 77.5898 | 1.2826 |

AUDITORY SIGNAL PROCESSOR USING SPIKING NEURAL NETWORK AND STIMULUS RECONSTRUCTION WITH TOP-DOWN ATTENTION CONTROL

STATEMENT OF GOVERNMENT RIGHTS

This invention was made with Government support under Contract Nos. DA033460, DC000100 and DC007610 awarded by the National Institutes of Health. The Government has certain rights in the invention.

BACKGROUND

This application is directed to the field of auditory signal processors such as used in hearing assistive devices (e.g. hearing aids and cochlear implants), speech-recognition applications and devices, and other applications requiring processing of acoustic scenes populated with multiple sound sources or other spatial components.

SUMMARY

In brief summary, an auditory signal processor is disclosed that includes a filter bank configured and operative to generate a plurality of frequency components of a source audio signal; a spatial localization network configured and operative in response to the frequency components to generate a plurality of spike trains for respective spatially separated components of the source audio signal; a cortical network configured and operative in response to the spike trains to generate a resultant spike train for selected spatially separated components of the source audio signal; and a stimulus reconstruction circuit configured and operative to process the resultant spike train to generate a reconstructed audio output signal for a target component of the source audio signal. The cortical network incorporates top-down attentional inhibitory modulation of respective spatial channels to produce the resultant spike train for the selected spatially separate components of the source audio signal, and the stimulus reconstruction circuit employs convolution of a reconstruction kernel with the resultant spike train generate the reconstructed audio output.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Organization of Description

This description is organized into Sections I and II as follows:

Section I—Brief introduction, overview of theory, block diagram description of auditory processor including attentional inhibitory modulation Section II—Detailed description of physiologically inspired model used in the auditory processor, including simulation results for aspects of system operation

Section I—Introduction, Theory, and Block Diagram Description

Introduction and General Block Diagram

Spiking Neural Networks (SNNs) are biologically accurate representations of neural networks. They operate on and output discrete binary values (neural spikes) and are well suited to process spatial-temporal data. Despite their theoretical advantages, SNNs are seldom used in practice for several reasons. First, there lacks good learning algorithms for these networks. This problem is slowly being solved by the modeling efforts in the neurobiology community (e.g. as we have described in the section titled "A PHYSIOLOGICALLY INSPIRED MODEL FOR SOLVING THE COCKTAIL PARTY PROBLEM"). Second, there lacks computational hardware suitable for carrying out efficient calculations of SNNs. This problem is currently being addressed with the advance of neuromorphic computing. For example, several firms have recently released neural processing units (NPU) for the acceleration of neural networks. Thirdly, the output of SNNs are binary spikes, and are difficult to interpret. Efforts have been made to estimate the original stimuli from SNN outputs, but the quality of these reconstructions remain low. In our previous work, we developed an SNN model how the cortex may solve the cocktail party problem. To decode the SNN, we employed a linear filter strategy to perform stimulus reconstruction.

Here, we present a system employing a novel strategy for stimulus reconstruction from neural spikes. Conceptually, this strategy uses time-frequency masking by computing a spike-based mask (spike-mask). We first consider the strategy for one-dimensional stimulus (e.g. sound waves). We show how this stimulus reconstruction method can be applied, using the cortical model as an example. We also show that this strategy produces reconstructions with intelligibility and quality higher than those reconstructed from the linear filtering method (table 1). Then we discuss how this strategy may be generalized for multi-dimensional stimulus (e.g. images and videos). The strategy presented here may be generalized to perform reconstruction on both artificial SNNs and neural models from experimental data as long as they satisfy the assumptions for our model.

Figure 1:
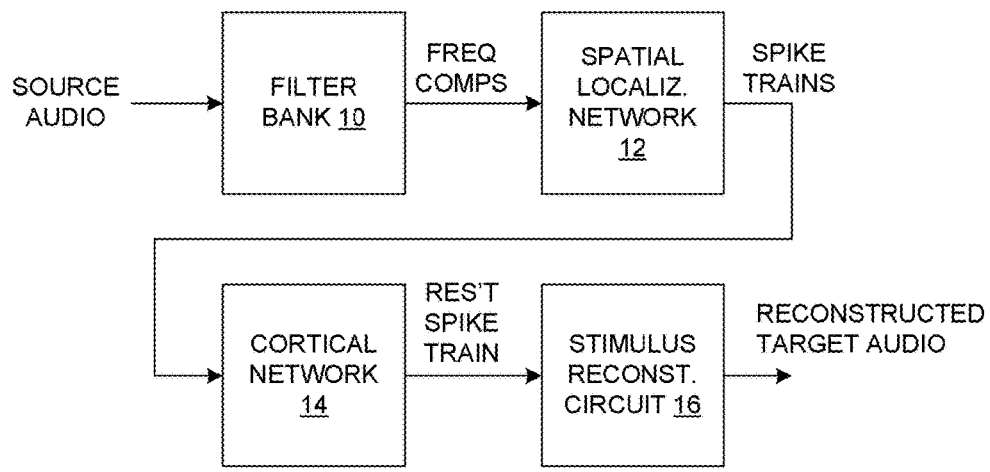
FIG. 1 is a general block diagram of an auditory signal processor.

FIG. 1 shows a general block diagram of an auditory signal processor, which includes a filter bank 10, spatial localization network 12, cortical network 14, and stimulus reconstructions circuit 16. In operation, the filter bank 10 applies a set of bandpass filters to a source audio signal that includes spatially distinct components, such as speech from different speakers in an environment of a listener for example. As described more below, the source audio is provided in binaural form, i.e., having left (L) and right (R) channels for example. The filter bank 10 generates a set of frequency components (FREQ COMPS), which are the outputs of the bandpass filters. The spatial localization network 12 operates on the frequency components to generate corresponding binary "spike" signals, also referred to as "spike trains", and the cortical network 14 operates on the spike trains to generate a single spike train referred to as a "resultant" (REST) spike train. The stimulus reconstruction circuit 16 applies processing to the resultant spike train to generate reconstructed target audio, which may be for example a relatively isolated or otherwise enhanced version of a particular spatial component of the source audio, for example the speech of a particular speaker in the environment. Details of the operations of the components are described in further detail below.

Theory

This section presents general theory of operation as well as certain specifics for realization of the stimulus reconstruction circuit 16 that are also described in additional detail further below.

Speech signals can be approximated as a summation of band-limited signals:

$$s(t) \cong \tilde{s}(t) = \sum_{n=1}^{N} s_n(t),$$

where N is the number of bandpass filters in a filterbank. Each band-limited signal can be represented parametrically as follows:

$$s_n(t) = A_n(t)\cos(\phi_n(t)),$$

where $A_n(t)$ is the Hilbert Envelope and $\phi_n(t)$ is the Hilbert instantaneous phase. The goal in speech reconstruction is to estimate $A_n(t)$ and $\phi_n(t)$ from spike trains. It follows that it is necessary to have a set of spike-trains corresponding to each frequency band. It is assumed that the envelope $A_n(t)$ drives the model neuron, and the fine-structure, $\cos(\phi_n(t))$, does not play a role in this process.

One of the simplest model neurons is the leaky integrate and fire (LIF) model. In this model, the membrane potential, V, is described by $$\tau_m \frac{dV}{dt} = E_L - V + R_m I_e$$

where $\tau_m$ is the membrane constant, $E_L$ is the resting potential, $R_m$ is the membrane resistance, and $I_e$ is the driving current. The model neuron fires an action potential (spike) whenever V exceeds some threshold voltage, then V is set to a reset voltage. It can be shown that the firing rate of the neuron has an approximately linear relationship with the driving current. The input signal acts like the driving current, and the firing rate is therefore proportional to the power of the input signal. In addition, the slow-varying envelope acts as the driving signal, and $A_n(t)$ only contains low frequency information within the band-limited signal. Therefore, we do not have to consider the case where the firing rate of the neuron becomes limited by its refractory period.

One other element that needs to be considered is modeling the waveform that causes a single action potential. Since most neural dynamics follows the form of an alpha function, we assume a reconstruction kernel for eliciting an action potential also follows the same form:

$$k(t) = te^{-\frac{t}{\tau}}$$

where $\tau$ is the time constant of the alpha function. This parameter would need to be re-optimized if the dynamic of the model neuron changes. The reconstruction kernel should correspond as closely to the waveform that elicits an action potential in the encoding model as possible.

To decode the spike-trains back into the time-domain, the reconstruction kernel is convolved with the spike trains $r_n(t)$:

$$\hat{a}_n(t) = k(t) * r_n(t)$$

From here, there are multiple methods of re-synthesizing $s_n(t)$. These are described in turn below. The techniques are labelled from SM3 to SM1, reflecting a performance ranking as also described further below.

In one technique referred to as SM3, if the original signal s(t) is not known a priori, then we can approximate $\cos(\phi_n(t))$ with $\cos(\omega_n t)$. This re-synthesis yields $$\hat{s}_{voc} = \sum^{N} \hat{a}_n(t)\cos(\omega_n t)$$

In a second technique SM2, the s(t) is known a priori, then one way of re-synthesis is to use $\hat{a}_n(t)$ as a modulator to place emphasis on certain time frequency tiles:

$$\hat{s}_{ori} = \sum^{N} \hat{a}_n(t) A_n(t) \cos(\phi_n(t))$$

This method is particularly useful in sound segregation applications. When s(t) contains multiple sound sources, and the processed spikes $r_n(t)$ represents the set of spikes of one target sound source, then $\hat{a}_n(t)$ places emphasis on the time-frequency tiles where the target source dominates. This method of reconstruction enables us to suppress the energies of off-target sound sources, and thus isolating the target sound.

A shortcoming of this strategy is that while the masker contribution to $A_n(t)$ is suppressed, masker contribution to $\phi_n(t)$ is not. Therefore, sound from the maskers is sometimes audible in $\hat{s}_{ori}$. To overcome this, a technique SM1 may be used in which $\cos(\phi_n(t))$ is replaced with $\cos(\omega_n t)$:

$$\hat{s}_{env} = \sum^{N} \hat{a}_n(t) A_n(t) \cos(\omega_n t)$$

This method replaces $\phi_n(t)$, which contains masker information, with a neutral phase component $\omega_n t$.

The above describes encoding and decoding of signals by single neuron. For a network of neurons, the neural dynamics of an LIF neuron is modified to consider post synaptic conductance:

$$\tau_m \frac{dV}{dt} = E_L - V - r_m \bar{g}_s P_s (V - E_s) + R_m I_e$$

Where $r_m$ is the cell membrane resistance, $\bar{g}_s$ is the maximum membrane conductance, $P_s$ is the probability of ion channels are open, and $E_s$ is the reset voltage. The membrane current, $r_m \bar{g}_s P_s E_s$, and the membrane conductance, $r_m \bar{g}_s P_s V$, act as additional driving forces to the model neuron. In a network, there may be many types of connections between neurons. The general decoding strategy is still applicable to SNNs. Layers of SNN may be executed sequentially, resulting in a time delay, $t_\Delta$, between when stimulus enters the input layer and when that same stimulus is relayed to the final layer. The decoding kernel is modified to address this issue:

$$\hat{a}_n(t) = k(t - t_\Delta) * r_n(t)$$

The decoding kernel is preferably modified if the model neurons have different dynamics. For example, it may be beneficial to use a double exponential rather than a single exponential for k(t) for certain models.

Additional Block Diagram Description and Performance

Figure 2:
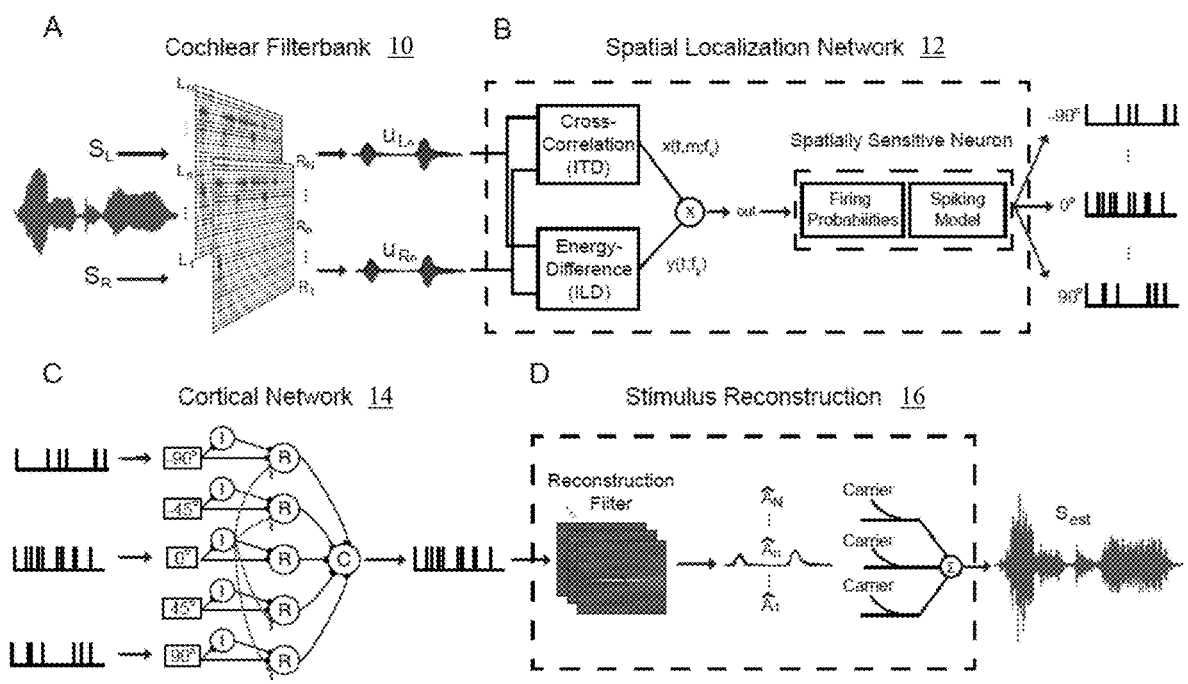
FIG. 2 is a more detailed block diagram of an auditory signal processor.

FIG. 2 shows an embodiment of the auditory processor in additional detail. The illustrated processing is also referred to herein as embodying a "physiologically inspired algorithm" or PA. Panel A shows the filter bank 10 as a cochlear filterbank. Left and right channels of the input ($S_L$ and $S_R$) are filtered separately. In one embodiment this is an equivalent rectangular bandwidth (ERB) gammatone filterbank. The outputs $u_{L_n}$ and $u_{R_n}$ illustrate the output of the ith frequency channel. The output signals' envelopes are emphasized blue. Panel B shows the spatial localization network 12 for one frequency channel. Left and right outputs from each frequency channel are used to calculate timing and level differences, and a neuron spiking model simulates a spiking pattern. Each frequency channel is processed by the network independently. The spatial localization network 12 may also be referred to herein as a "midbrain model." Panel C shows the cortical network 14, receiving spikes from differently tuned spatial neurons as input. In this case there is an input layer with spatially tuned inputs at −90, −45, 0, +45 and +90; a middle layer with relay neurons R and inhibitory interneurons I; and an output C which is a cortical neuron. The population of spikes from each frequency channel is processed by the cortical network independently. Panel D shows a particular realization of the stimulus reconstruction circuit 16, which is the use of a reconstruction filter for each frequency channel, used to calculate envelopes of sound (Â) from neural spikes from the cortical network 14. A carrier of the sound is added to the envelope by multiplication, and the estimated sounds from the frequency channels are summed to produce a final acoustic output $S_{est}$. Alternative realizations of the stimulus reconstruction circuit 16 are described below.

Figures 3, 4:
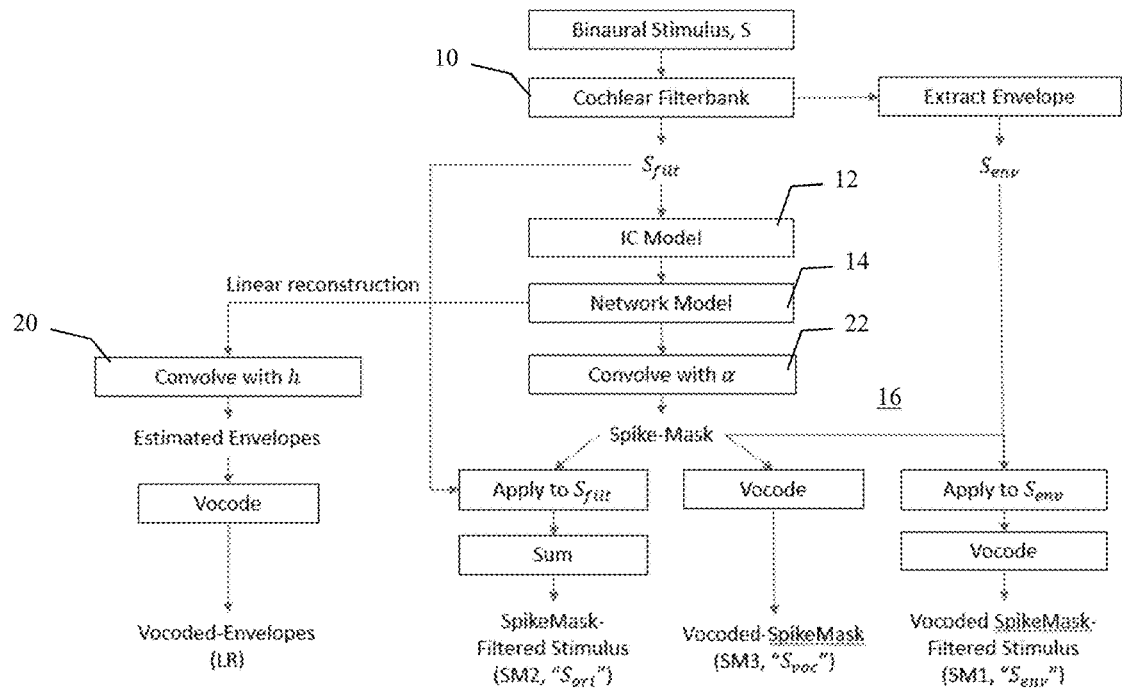
FIG. 3 is a functional block diagram of an auditory signal processor showing alternative modes of stimulus reconstruction.
FIG. 4 is a table of performance results for different stimulus reconstructions techniques.

FIG. 3 illustrates additional detail, showing the filter bank 10, the spatial localization network (IC model) 12 the cortical network (network model) 14, and components of the stimulus reconstruction circuit 16. Alternative reconstruction components are shown, as described more below.

The Binaural stimulus, S, is a dual-channel auditory stimulus waveform with left (L) and right (R) channels. The Cochlear Filterbank 10 is an ERB gammatone filterbank, covering the range of human speech. In one example, 32 channels are used to cover the frequency range 300-5000 Hz. The signal S_filt is a dual channel signal with L and R components (same as the original stimulus) that has been filtered by the ERB filterbank 10. Each of the L and R components consists of multiple frequency channels, corresponding to the number of channels used in the Cochlear filterbank 10. The IC model 12 is a spatial localization network which computes sound location based on binaural cues, then encodes the acoustic stimulus at a particular spatial location into neural spikes using physiologically based model neurons. In one case the IC model may be based on a model of the barn owl. The Network Model 14 is a cortical model that suppresses simulated neural activity from off-target locations using cortical inhibition, as described in detail in Section II below titled "A PHYSIOLOGICALLY INSPIRED MODEL FOR SOLVING THE COCKTAIL PARTY PROBLEM". In the case of linear reconstruction, a function h is used which is a linear filter that needs to be pre-determined using a set of training stimuli and responses.

Thus four reconstruction techniques are shown, three of which correspond to those described above in the Theory section. In the case of linear reconstruction (LR), the spike train from the network model 14 is applied to a convolver 20 that convolves the spike train with the function h to produce an estimated envelope that is then voice-coded (Vocode). Details of LR reconstruction are also provided further below. The other three techniques employ an alternative convolver 22 that convolves the spike train with a time-frequency mask, and the resulting spike-mask is further processed in one of three ways: (1) Applied to $S_{env}$ and vocoded (SM1 technique), (2) applied to $S_{filt}$ and summed (SM2 technique), or (3) vocoded directly (SM3 technique).

FIG. 4 presents a table showing a comparison of the performances of the three spike-mask (SM1-SM3) methods in addition to the stimulus reconstruction (LR) method. Two widely used metrics of performance are those for speech intelligibility (STOI) and quality (PESQ). The STOI measure can also be used to predict the intelligibility of speech to human subjects. In this assessment, the first spike mask method SM1 has the highest value of STOI and predicted intelligibility for both target alone and target in the presence of two symmetric maskers.

Figure 5:
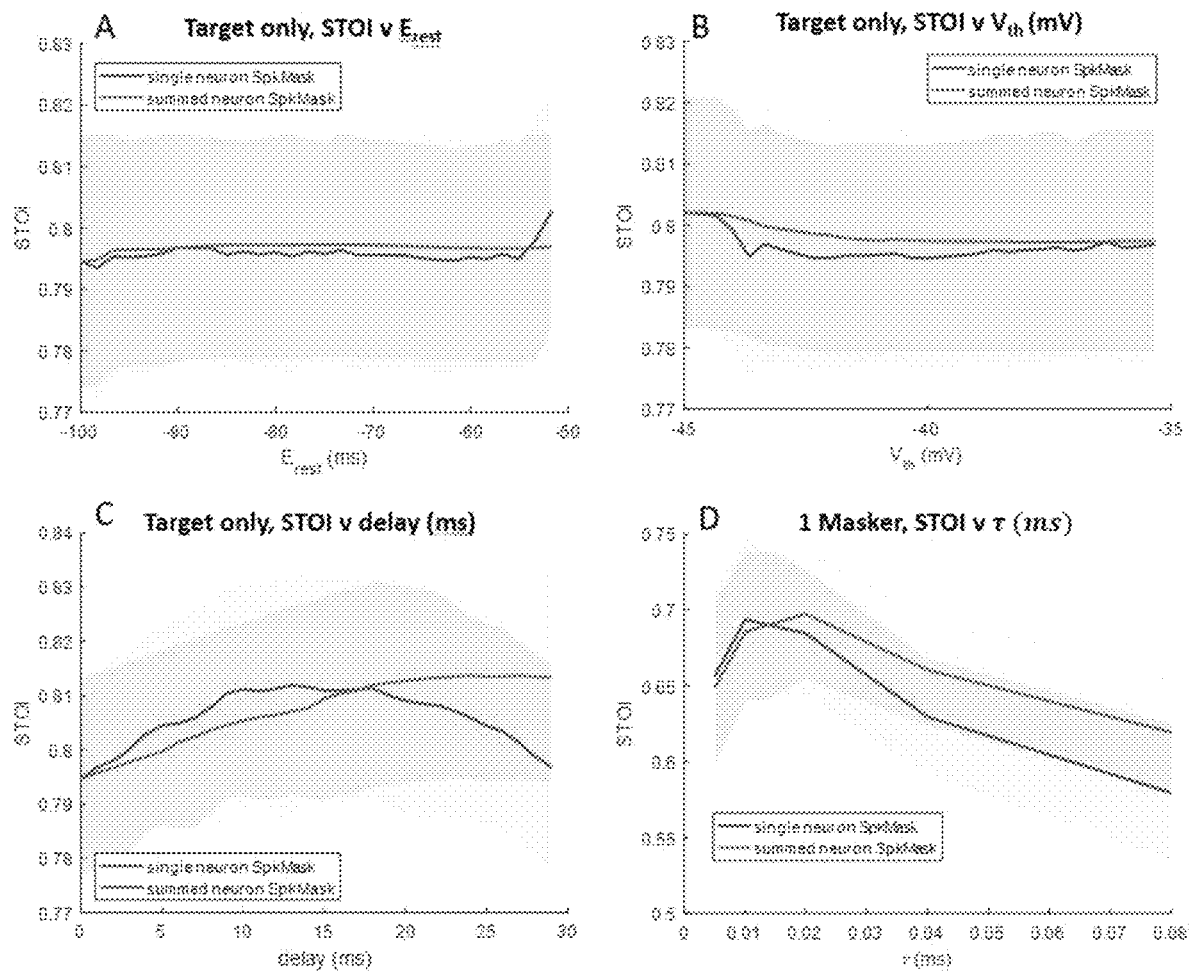
FIG. 5 is a set of plots of performance results in which different parameters are varied.

FIG. 5 shows simulation results that detail the effects of varying model parameters on STOI for method SM1. Panel A shows STOI versus resting membrane potential. Panel B shows STOI versus threshold. Panel C shows STOI versus delay, and Panel D shows STOI versus time constant of reconstruction kernel (alpha function). The simulations employed models with both single cortical neurons in each frequency channel (first curves) as well as populations of neurons per frequency channels (second curves). The results show that resting membrane potential and threshold have relatively little effect on reconstructions (Panels A and B). Single neurons per frequency channel with an appropriate delay performed comparably to populations of neurons per channel (Panel C). The optimal time-constant for the alpha function for the single neuron per channel was 0.012 ms (Panel D).

Top-Down Control of Network Using Spatial Attention

Top-down control of cortical circuits for flexible spatial processing is thought to be critical for solving the cocktail party problem. Previous computational approaches to the cocktail party problem have largely focused on modeling bottom-up stimulus-driven spatial processing; A computational framework for top-down attentional control of cortical spatial processing circuits is currently lacking. Such a framework can motivate novel experiments and brain-inspired algorithms.

Figure 6:
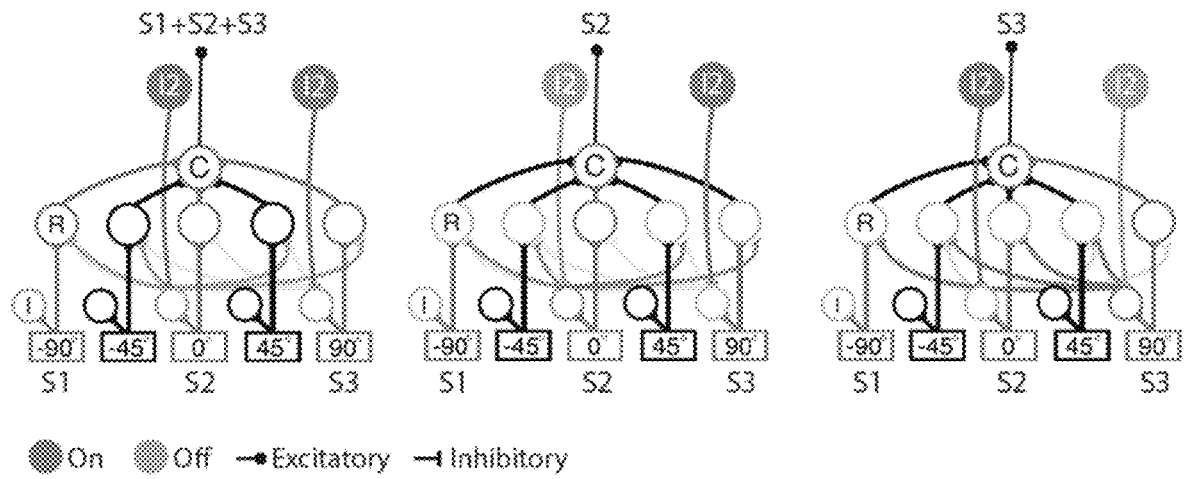
FIG. 6 is a diagram illustrating examples of top-down attentional control.

FIG. 6 illustrates a novel cortical network model that employs attentional inhibitory modulation (AIM) to solve the cocktail party problem. Specifically, AIM uses top-down attentional modulation of distinct populations of cortical inhibitory neurons I to control bottom-up, cortical, spatial processing circuits. This mechanism enables the network to broadly monitor the auditory scene, aim the spotlight of attention to select a target sound, and switch among targets, in a flexible and dynamic manner. In summary, AIM is a brain inspired network for solving the cocktail party problem incorporating spatial attention.

In FIG. 6, the AIM network is shown as operating on spatially segregated inputs at the bottom. Three cases with corresponding sets of activated neurons and connections are shown. In all cases, selected inputs are sent to relay neurons (R) and integrated at the cortical neuron (C). The three examples are referred to as Left, Center and Right for their position in FIG. 6, and are described as follows:

Left: Both inhibitory neurons (I2) are active, such that corresponding lower-level inhibitory neurons (I) are inactive and thus all three channels −90, 0 and +90 are enabled. The result is the combination of speakers/sources S1+S2+S3.

Center: When the left top-down inhibitory neuron (I2) is inactive, corresponding lower level inhibitory neurons (I) turn on and suppresses (R) neurons from other spatial channels. Only the center spatial channel (0) information is present at the output (S2).

Right: The information at the output is switched to S3 by switching the inactive I2 neuron.

Figure 7:
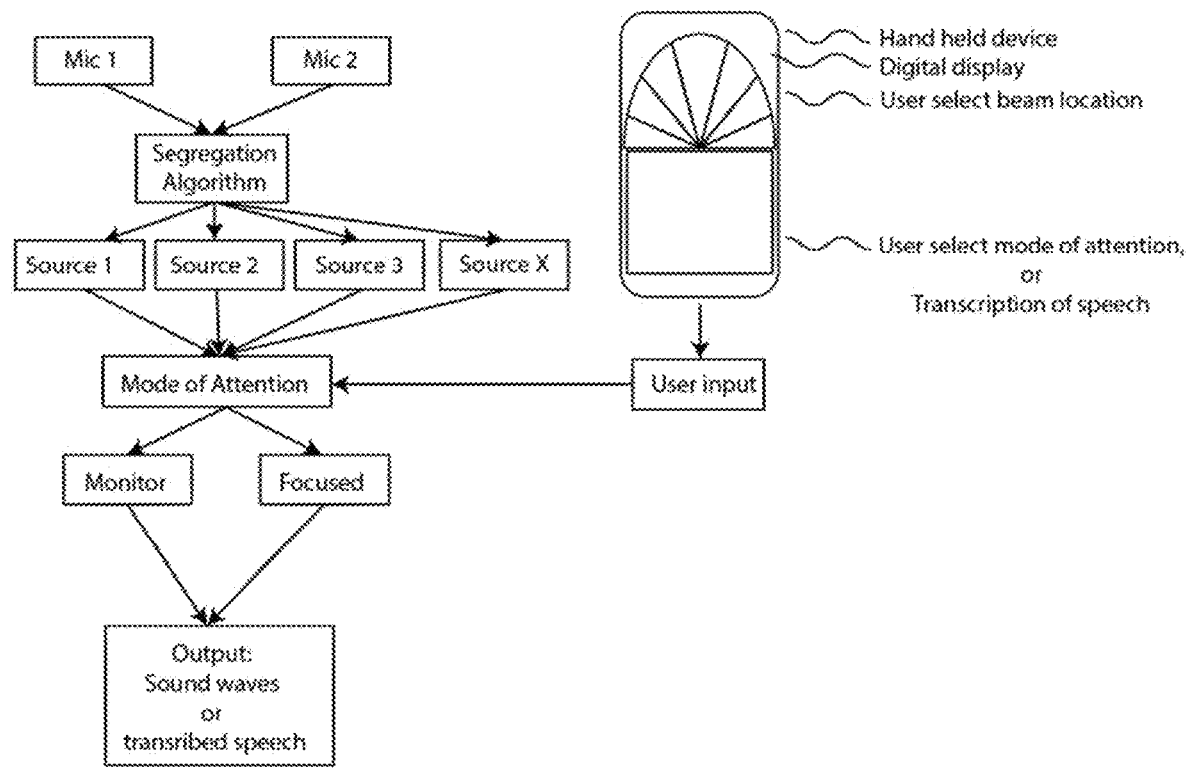
FIG. 7 is a block diagram of an auditory device incorporating the auditory signal processor.

FIG. 7 illustrates an auditory device incorporating an auditory processor as described herein. As shown, it includes audio input circuitry which in this example includes a pair of microphones Mic 1, Mic 2, and the auditory processor which is illustrated by a collection of functions including the segregation algorithm, mode of attention, etc. It also includes output circuitry that generates an output which may be acoustic audio (i.e., sound audio for a reconstructed stimulus) or other output such as text or transcribed speech (assuming use voice-to-text technology on the audio output), for example. The segregation algorithm produces spike trains for the different sources shown as source 1, source 2, etc., and the selection of one or more sources by the mode of attention is controlled by user input as shown, which may be provided from a separate device shown as a hand-held device (e.g., a smart phone).

The following are potential specific realizations of an auditory device that incorporate features shown in FIG. 7, including primarily the use of the presently disclosed auditory signal processor:

1. Hearing devices—user picks target in a multi-talker environment using an interface (e.g. a smart phone):
    Ear pods/headphones
    Hearing aids
    Cochlear implants
2. Automatic Speech Recognition in noisy or multi-talker environments, e.g., in devices such as SIRI or Alexa
3. Video Transcription—Transcribe all auditory objects in the auditory scene. Can label and save all transcripts, or user can select to view the transcript for one particular auditory object.
4. Field Recording—automatically chosen target
    Detect desired target and hone in
    Scientific purposes—biological observations
    Surveillance applications—listen to a selected source
5. Classroom settings—teacher select what students should listen to
    Training students with ADHD/Autism who have difficulty paying attention to specific sources.

Thus, rather than microphone input, the audio input could include dual channel audio or video recordings where the spatial configuration of the recording microphones is known. The technique is applicable to processing selected sound sources in audio/video recordings.

Additionally, rather than generating acoustic audio output (i.e., actual sound via loudspeakers), the audio output could be further transcribed into text using standard voice-to-text technology. The technique is applicable to transcription of audio/video recordings.

Generally, the aim of the disclosed technique is to decode the outputs of SNN into a form that can be understood intuitively by human. The above derivation assumes speech waveforms are the targets being processed. Many speech processing SNN algorithms can be derived by modeling experimental data, including de-noising and sound segregation. In these examples, s(t) is known a priori, and therefore it would be possible to reconstruct the stimulus with high quality and intelligibility. This reconstruction method enables these models to be used for practical applications, including sound segregation (such as for a hearing assistance device) as described herein in detail. Other applications include coded signal transmission, and other kinds of data.

In the case of coded signal transmission as well as other application, s(t) would not be known a priori. Transmission of data as spikes can decrease the amount of data being transferred, and would free up a tremendous amount of bandwidth. Decoding transmitted data is a tremendous issue, due to possible packet loss and noise. Although spike-trains can be perfectly decoded, known techniques may be sensitive to noise. In addition, it may be necessary for spiking rate to exceed the upper limit of the bandwidth of the signal being transmitted. In contrast, the presently disclosed technique uses a model neuron driven by the low frequency $A_n(t)$. As a result, fewer spikes are generated and transmitted. In addition, this method is relatively insensitive to spike-loss. Decoding spike trains with s(t) not known a priori into an intelligible signal is made possible by the work presented here.

It may be possible to extend the disclosed technique to higher dimensional data by treating them like speech data. For example, images can be divided in the x- or y-spatial dimension into sets of one-dimensional data. Each set of 1D data can then be decomposed using filter banks and encoded then decoded, as described herein.

Section II—Physiologically Inspired Model, Results

Figure 8:
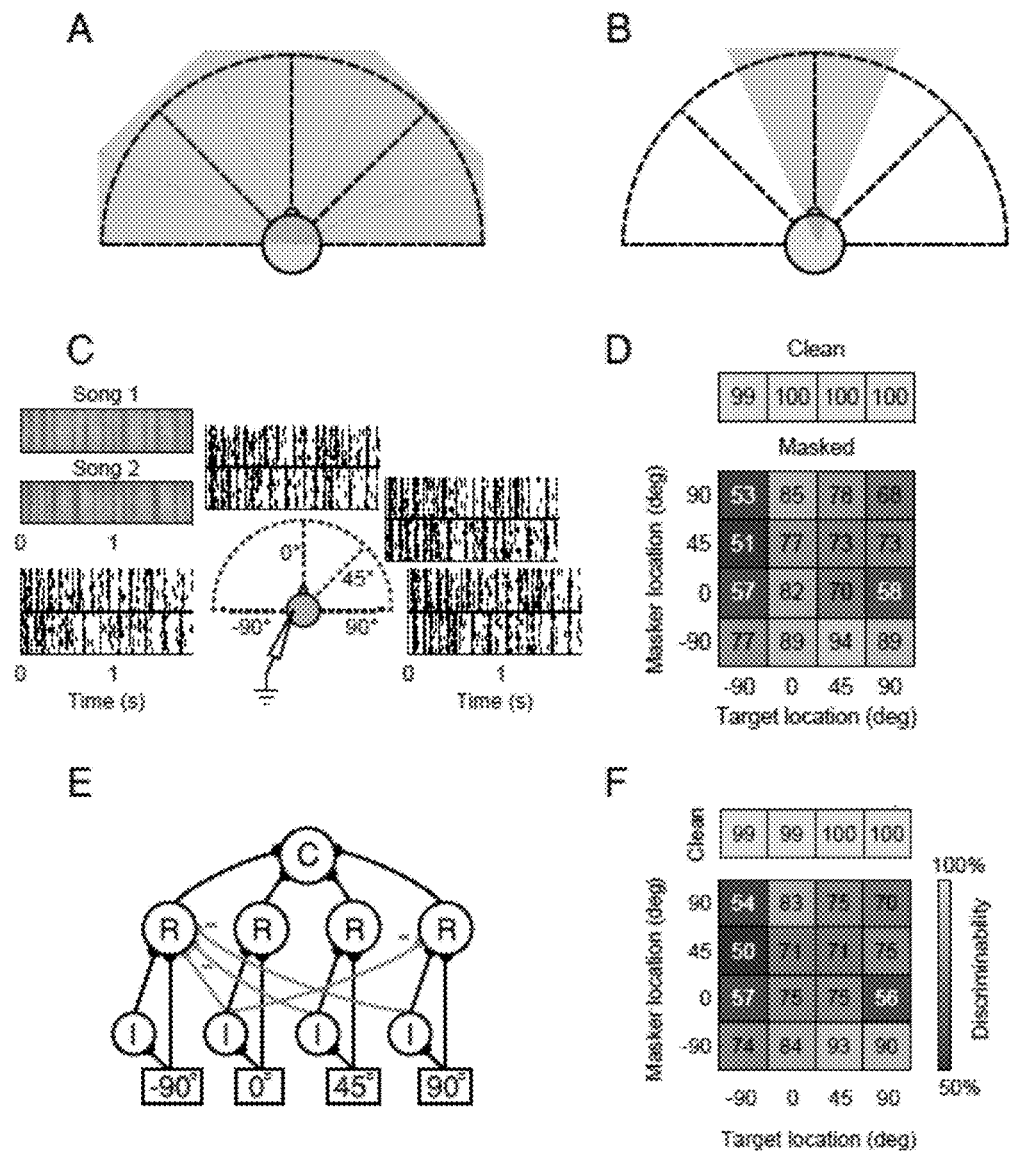
FIG. 8 is a schematic depiction of flexible modes of spatial hearing

This section makes references to FIG. 2 (described above) and FIGS. 8-11, which are briefly described below:

FIG. 8 illustrates flexible modes of spatial hearing. Panel A illustrates a Monitor mode for broadly monitoring the entire acoustic space to detect key events. Panel B shows a Selective mode for selectively listening to specific targets in the presence of competing maskers. Panel C shows cortical responses in songbirds in various conditions. Two bird songs were played separately from four locations in isolation ("Clean") or in the presence of a masker ("Masked"). Neural responses to each song in the clean condition are shown at each location. Panel D shows neural discriminability between the two songs (percent correct, chance is 50%). Top: performance in the Clean condition. Bottom: spatial grid for all possible combinations of target and masker locations. Note the "hotspots" of performance values at certain positions on the spatial grid (lighter colors). Panel E) shows model cortical network for generating spatial grid. Input layer: spatially tuned inputs at −90, 0, 45 and +90. Middle layer: R: Relay neurons and I: inhibitory interneurons. Output C: cortical neuron. Light blue lines indicate cross-spatial channel inhibitory connections. Panel F shows simulated clean performance and spatial grid from model.

Figure 9:
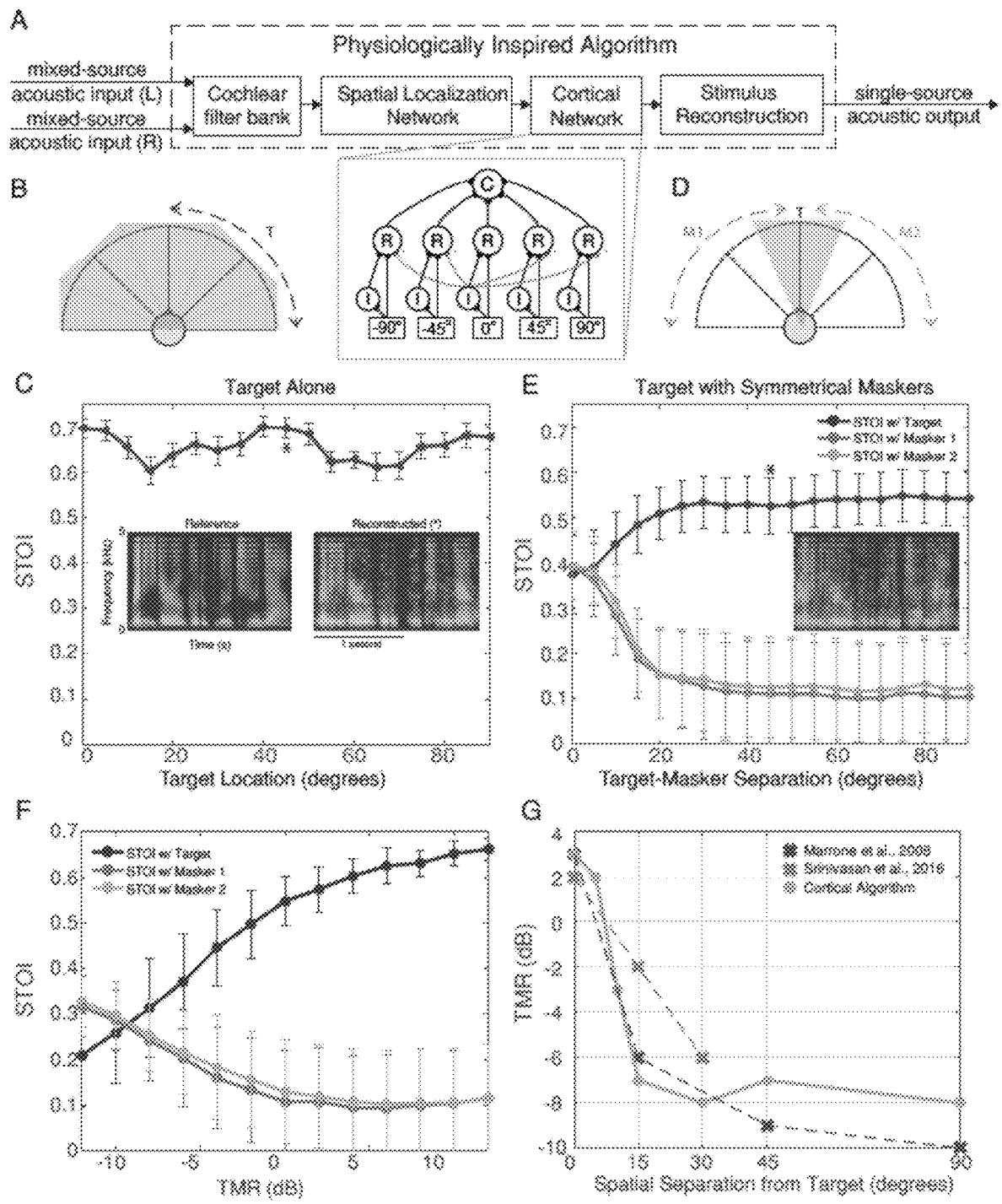
FIG. 9 is a schematic depiction of structure and results from a physiologically inspired algorithm.

FIG. 9 illustrates the physiologically inspired algorithm. Panel A is a flow diagram of the algorithm. Dual channel (L and R) audio is used as the input to CA. The CA consists of a cochlear filterbank, a spatial localization network, the cortical network and a stimulus reconstruction algorithm (see Methods). The output is a single acoustic waveform. The inset shows a frontal beam-former cortical network where 0° inhibits all other spatial channels. Panel B shows a Monitor mode simulation with the target alone roved from 0 to 90 degrees. Panels C shows Short-Time Objective Intelligibility measure (STOI) as a function of location. The high STOI across all locations indicate that the physiologically-inspired algorithm can capture single-sources in all spatial locations. Insets show the spectrograms for the vocoded target and the reconstructed output for the target position of 45 degrees indicated by the asterisk. Panel D shows a Selective mode in which the target sentence is fixed in the front, while two maskers are placed symmetrically at angles from 0 to ±90 degrees. Inset shows the spectrogram of the reconstructed output for when the maskers are positioned at ±45 degrees (indicated by the asterisk). Panel E shows the STOI of the reconstructed output is computed with both the vocoded target and masker signals as reference. As the separation between target and maskers increases, the reconstructed signal shows higher STOI with regard to the target and lower STOI with regard to the masker, indicating that the CA is effectively segregating the frontal target from the maskers. Panel F illustrates robustness of the CA. STOI curves with respect to target and maskers vs. target to masker ratio (TMR). Panel G illustrates comparison with psychophysics.

Figure 10:
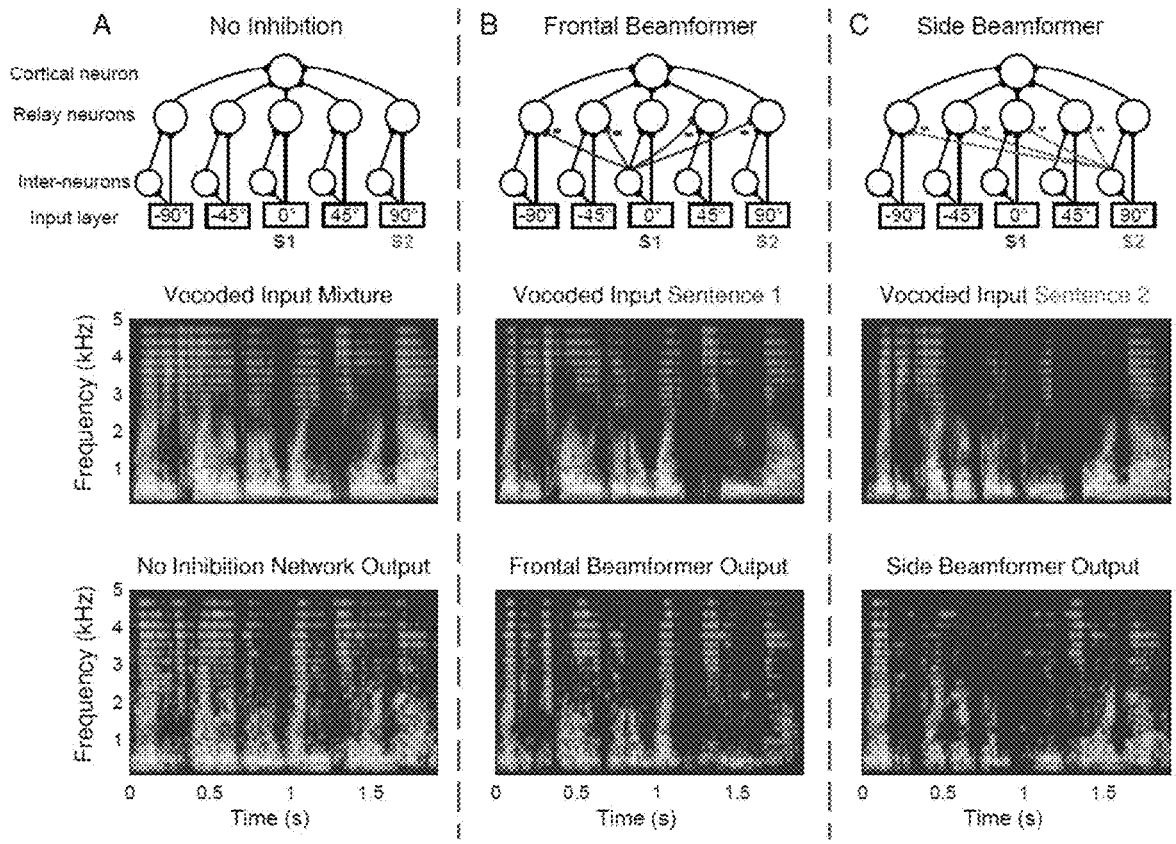
FIG. 10 is a set of plots of results for different configurations of a cortical network.

FIG. 10 shows results for different configurations of the cortical network 14. For all simulations, two sentences were presented from 0° (S1) and 90° (S2) simultaneously. Section A shows that with no cross-spatial channel inhibition, the cortical network is broadly tuned and the reconstructed stimulus resembles the mixture of both sentences (spectrograms in middle and lower panels). Section B shows that with a frontal beam-former cortical network, the reconstructed stimulus resembles the sentence presented from front (S1). Section C shows that with a side beam-former network, the reconstructed stimulus resembles the sentence presented from 90° (S2).

Figure 11:
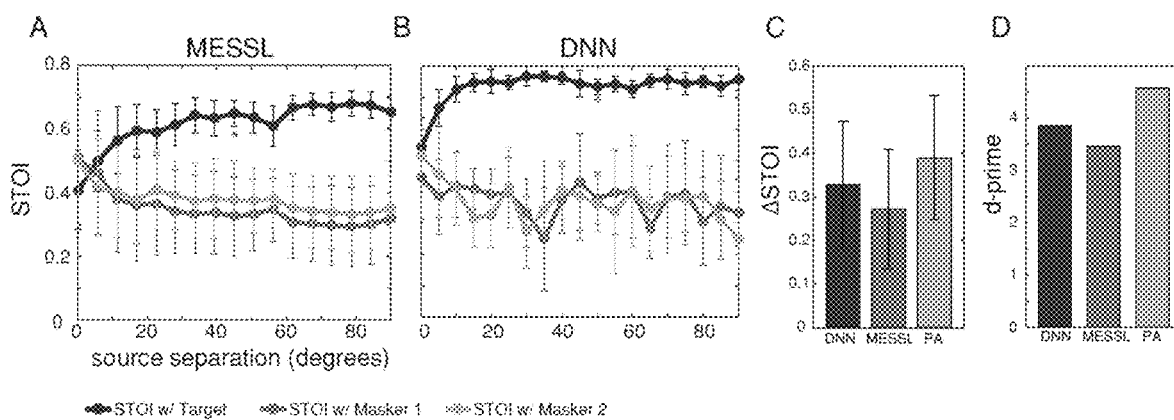
FIG. 11 is a set of plots showing a comparison of segregation performance.

FIG. 11 illustrates a comparison of segregation performance. The configuration for these simulations was the same as shown in FIG. 9 panel E. Target in front and two symmetrically located maskers roved from 0 to ±90 degrees in 5 degree increments. Panels A and B show STOI curves with respect to target and masker, for MESSL and DNN respectively. Panel C shows a differential ΔSTOI for all three algorithms. Panel D shows d' for all three algorithms. Panels C and D were calculated for separation angle of 45°, indicated with asterisks in panels A and B.

In different sound environments, people can broadly monitor the entire acoustic scene to detect important cues (e.g., our names being called, or the fire alarm going off), or selectively listen to a target sound source (e.g., a conversation partner). It has recently been observed that individual neurons in the avian field L (analog to the mammalian auditory cortex) can display broad tuning to single targets and selective tuning to a target in spatially distributed sound mixtures. Here, we describe a model inspired by these experimental observations and apply it to process mixtures of human speech sentences. This processing is realized in the neural spiking domain. It converts binaural acoustic inputs into cortical spike trains using a multi-stage model composing a cochlear filter-bank, a midbrain spatial-localization network, and a cortical network. The output spike trains of the cortical network are then converted back into an acoustic waveform, using a stimulus reconstruction technique. The intelligibility of the reconstructed output is quantified using an objective measure of speech intelligibility. We apply the algorithm to single and multi-talker speech to demonstrate that the physiologically inspired algorithm is able to achieve intelligible reconstruction of an "attended" target sentence embedded in two other non-attended masker sentences. The algorithm is also robust to masker-level and displays performance trends comparable to humans. This physiologically inspired algorithm may help improve the performance of hearing assistive devices (e.g. hearing aids and cochlear implants), speech-recognition technology, and computational algorithms for processing natural scenes cluttered with multiple acoustic objects.

In the auditory domain, the problem of understanding a speaker in the midst of others is termed the "Cocktail Party Problem", or CPP, and it is a focus of intensive research in a diverse range of research fields. Although hearing assistive devices and speech recognition technology have difficulties under CPP-like conditions, normal hearing listeners can solve the CPP with relative ease, indicating that a solution exists somewhere in the brain.

An impressive aspect of the CPP is the flexible spatial listening capabilities of normal hearing listeners. A listener can broadly monitor the entire auditory scene for important auditory cues (FIG. 8 panel A), or select a target speaker at a particular location (FIG. 8 panel B). Indeed, the selection of the most relevant target often requires careful monitoring of the entire acoustic scene. Such flexible listening, which supports the ability to effectively solve the CPP, has yet to be replicated by machine-hearing algorithms or hearing-assistive devices.

In most social situations, e.g., a cocktail party, speakers are spatially distributed. Previous studies in birds and cats have suggested that spatially distributed sounds are segregated at the subcortical levels in the ascending auditory pathway. Though the specific differences in encoding across species remains an active research area, a key open question remains in both species: how does flexible modes of listening emerge from spatially localized representations in the midbrain? Auditory cortex is a likely to play an important role in this behavior, as cortical responses correlate well with behavior, and reflect attended sounds in sound mixtures.

Prior studies of the zebra finch field L (analog to the mammalian auditory cortex) found that neurons in the auditory cortex display flexible different tuning behaviors, which are dependent on their surrounding acoustic environment. When target sounds (birdsongs) were presented separately from one of four spatial locations, the cortical neuron showed broad spatial tuning (FIG. 8 panel C), as indicated by similar discriminability performance across different locations (FIG. 8 panel D, upper part). Remarkably, the neuron's spatial tuning sharpened when a competing sound (song-shaped noise), was played simultaneously from a different location. Such a neuron is sensitive to the spatial configuration of the target and the masker (FIG. 8 panel D, lower part). A similar observation has been made in mammals, where spatial tuning is sharpened in the presence of multiple spatial streams, although in this case the sound streams were not simultaneous.

This description presents a multi-stage model, which displays this flexible tuning characteristic, for processing multiple spatially distributed sound sources into a single audible acoustic output. The model is a generalization and application of a proposed model network for explaining the observations in the songbirds (FIG. 8 panel E). In our model, sound mixtures are encoded and processed in the neural spiking domain. Our model assumes that spatial segregation is achieved at the midbrain level, and segregated sounds are either integrated or selected at the cortical level. The processed spikes are then decoded via a linear stimulus reconstruction algorithm. We demonstrate the flexible tuning characteristic of the model, and compare its segregation performance with other engineering-based binaural sound segregation algorithms. There have been intensive efforts to solve the CPP using computational models for auditory scene analysis. To our knowledge, there are no physiologically based models for auditory scene analysis that exploit the remarkable spatial processing capabilities of the auditory system. The goal of this study is to build a physiologically based model inspired by the cortical responses in songbirds, and thereby demonstrate how the auditory system might operate under CPP-like conditions. The model provides a foundation for physiologically based algorithms for solving the CPP and may motivate new physiological experiments to probe the auditory cortex. The general principles of this algorithm could potentially also be applied in the visual domain, e.g., for processing selected visual targets in complex "cluttered" scenes with multiple visual objects, a challenging problem in computational vision.

Methods

Speech Stimuli.

The Coordinated Response Measure (CRM) Corpus was used to train and test the novel stimulus reconstruction technique, as well as test the segregation and reconstruction results using our physically inspired model. The CRM Corpus is a large set of recorded sentences in the form of [Ready CALLSIGN go to COLOR NUMBER now], where callsign, color, and number have 8, 4, and 8 variations, respectively. All recordings were stored as 40 kHz binary sound files. Directionality was added to the recordings by convolving each recording with KEMAR head-related transfer functions (HRTFs) corresponding to the appropriate location.

Physiologically Inspired Algorithm (PA).

The PA is a sound processing algorithm that is based on the auditory system. It receives binaural speech inputs and transforms the speech signals into neural spikes for processing. After processing, it reconstructs the neural spikes back into the acoustic domain. The PA is composed of four key stages of processing: a cochlear filterbank, a midbrain spatial localization model, a cortical network model, and a stimulus reconstruction step. Below, we describe each of these components in detail. These components are also illustrated in FIG. 2.

Cochlear Filter-Bank.

The cochlear filterbank 10 (FIG. 2) represents a fundamental stage in the processing of sounds at the periphery of the auditory system, where sounds are first decomposed into different frequency bands. This is implemented using an equivalent rectangular bandwidth (ERB) gammatone filterbank, a widely used representation in computational models of the auditory system. The filterbank consists of 36 frequency channels ranging from 300 to 5000 Hz. The PA uses 36 frequency channels because it provides a good balance between physiological accuracy and computational complexity. Additional frequency channels provided minimal benefit to the model. Subsequent stages of the model assume that each frequency channel is processed independently, thus the processing during each subsequent stages of the model are repeated for each frequency channel.

Midbrain Spatial Localization Network.

To identify the location of the sound source, the auditory system exploits two important spatial cues: the interaural time difference (ITD) and the interaural level difference (ILD). ITD is created when a sound arrives at the more proximal ear earlier than the more distal ear, while ILD is created when the head shadows the more distal ear, decreasing the loudness compared to the more proximal ear. To implement the spatial localization stage, we adapted a physiologically based model of the spatial localization network in the midbrain of the barn owl, one of the most accurate and best understood physiological systems for localizing sounds.

The spatial localization network 12 is illustrated in detail in FIG. 2. It assumes that frequency channels are independent of one another. It calculates ITD using a cross-correlation-like operation, and calculates ILD by taking the difference in the energy envelopes between the left and right signals. In a subsequent stage of processing in the inferior colliculus, the ITD cues are combined with ILD cues via a multiplication-like operation. These model neurons are also responsible for transforming the acoustic inputs into neural spikes. The firing probabilities for the ICcl model neurons are calculated by adding the ITD and ILD signals at the sub-threshold level followed by an input-output non-linearity given by a threshold sigmoid function. This overall operation effectively represents a multiplication of ITD and ILD cues as observed physiologically.

We tuned the specific model parameters to match the ITDs and ILDs for a human head. To modify the parameters, we calculated the azimuth-specific ITD and azimuth- and frequency-specific ILD of KEMAR head-related transfer functions (HRTFs) for the azimuth locations used as input to the cortical network model (−90, −45, 0, 45, and 90 deg). For each preferred azimuth, we adjusted the ITD and ILD tuning parameters to match the ITD and ILD calculated for that azimuth and frequency.

Cortical Network Model: Inhibition Across Spatial Channels.

The cortical network 14 implements the critical computation of inhibiting off-target spatial channels. The network implemented here uses neural spikes as both input and output, and its architecture is illustrated in FIG. 2. Each node of the network is composed of integrate-and-fire neurons. For all neurons, resting potential was −60 mV, spiking threshold was −40 mV, and the reversal potential for excitatory currents was 0 mV. In relay neurons, the reversal potential for inhibitory currents was −70 mV. In inter-neurons, excitatory post-synaptic conductance (EPSC) was modeled as an alpha function with a time constant of one millisecond. In relay neurons, both EPSC and inhibitory post-synaptic conductance (IPSC) were modeled as the difference of a rising and a falling exponential, where rise and fall time constants were 1 and 3 ms, and 4 and 1000 ms, respectively. An absolute refractory period of 3 ms was enforced in all neurons. Synaptic strengths were uniform across all spatial channels for the same type of synapse. The synaptic conductances between input to inter-neurons and relay neurons were 0.11 and 0.07, respectively. The synaptic conductance from relay to cortical neurons was 0.07. The conductance for the cross-spatial channel inhibition was 0.2, which was the minimum value required to effectively suppress off-target spatial channels. The network connectivity was set to select sounds originating from 0° azimuth, as shown by the blue inhibitory pathways in FIG. 2. The network is set up such that the inhibitory connections within the spatial channel have a sharpening effect, while across channel connections have an inhibitory effect. Cortical network models are specific for each frequency channel, and there are no interactions between frequencies. Frequency channels match those of the cochlear filter-bank.

Stimulus Reconstruction.

The output of the cortical network is a set of processed neural spikes. In order to evaluate the model performance, the neural response must be "translated" back to an acoustic waveform that humans can understand via a process termed "stimulus reconstruction". Here, we develop a novel stimulus reconstruction technique based on an estimation of a linear reconstruction (LR) filter (FIG. 2, ref. 16). The basic idea is to first convolve a neural spike train with a reconstruction filter function to estimate the envelopes of the acoustic waveform (see optimal filter, below). Since each frequency channel has a distinct set of neural spikes, this process is independently carried out for each channel. Then, the envelopes are used to modulate carrier signals to obtain narrowband signals. Finally, the narrowband signals across frequency channels are summed (without weighting) to obtain a reconstructed stimulus. We tested two different carrier signals for the reconstruction algorithm: 1) pure tones with frequencies equal to the center frequencies of each channel, and 2) band-limited noise limited to the frequency range for each frequency channel. In this manuscript, we present the results for pure tone carriers, which achieved the highest quantitative scores by the short time objective intelligibility (STOI, details in Measures of Reconstruction Quality and Segregation Performance, below) measure.

Optimal Filter.

Here, we developed a novel optimal two-dimensional filter which incorporates information across frequency channels. Traditionally, analytically-derived reconstruction filters assume that each frequency channel is independent of one another. For a set of stimulus and response from frequency channel f, the stimulus waveform $s_f(t)$ can be reconstructed from a set of spike trains $x_f(t)$ with spike-times $t_i (i=1, 2, \ldots, n)$, by convolving $x_f(t)$ with a linear reconstruction filter, $h_f(t)$, to obtain an estimate of the original stimulus: $s_{est,f}(t) = \Sigma_i {}^n h_f(t-t_i)$. We derive $h_f(t)$ in the frequency domain:

$$H(\omega) = \frac{S_{sx}(\omega)}{S_{xx}(\omega)},$$

where $S_{sx}(w)$ is the cross-spectral density of a training stimulus s(t) and the corresponding spike train x(t), and $S_{xx}(w)$ is the power spectral density of the neural training response. The estimated original stimulus is then found by taking the unweighted sum across individual frequency channels: $s_{est}(t) = \Sigma_f s_{est,f}(t)$.

In contrast to the analytical approach described above, we introduced a frequency dimension to the optimal linear filter, $h_f(t, \omega)$, to address the potential interactions across frequency channels. We then used gradient descent to minimize the mean-squared-error (MSE) between the original signal's envelopes and the reconstructed envelopes, treating the values of $h_f(t, \omega)$ as free parameters. The estimated stimulus is then $s_{est,f} = h_f(t, \omega) * x(t, \omega)$. Initial one-dimensional reconstruction filters were calculated in MATLAB, and two-dimensional filters were optimized using the Theano Toolbox in Python. We found that the optimal two-dimensional filter significantly improved the reconstructions by 71% relative to the one-dimensional filter, as assessed by the STOI measure (see Measures of Segregation and Reconstruction Quality, below).

Reconstruction Filter Training.

To train the reconstruction filter, we extracted one instance of all call-sign and color-number combinations from the CRM corpus and concatenated these into a nine-second duration sound waveform. To derive the optimal filter, the audio waveform was presented to the PA at 0 degrees as the training input stimulus, and the corresponding cortical response was used as the training target. Since the optimal filter is a mapping between the clean CRM utterances (prior to introducing HRTF) and neural spikes, the effect of HRTF are removed from the reconstructed stimuli. After deriving the reconstruction filter, we tested the algorithm on other CRM sentences and their corresponding neural responses. Note that the training phase only requires training on clean speech.

Test Simulation Scenarios.

To test the segregation and reconstruction quality using the PA, we configured the network to "attend to" 0° azimuth (see cross channel inhibitory connections in FIG. 2). We randomly selected 20 trios of CRM sentences, with the criterion that sentences in each trio cannot contain the same call-sign, color, or number. For segregation simulations, the first sentence in each trio was designated as the target, while the remaining sentences served as symmetrical maskers. Two simulations were conducted for each trio, switching the location of the two masker sentences. For the target alone simulation, only the first sentence in each trio was used.

We designed three simulations to demonstrate that the PA is capable of: 1) monitoring the entire azimuth in quiet, 2) selectively encoding a preferred location while suppressing another non-preferred location when competition arises, and 3) robustly encoding a preferred location when maskers became louder than targets. In the first simulation, we presented the PA with a single target at locations between 0 to 90 degrees in azimuth, at five-degree intervals. We then calculated assessment measures (see Measures of reconstruction quality and segregation performance) of the quality and intelligibility of the reconstructed signal compared to the original vocoded target signal. In the second simulation, we presented one sentence at the target location (0°) and two masker sentences at symmetrical locations in five-degree intervals from 0 to ±90 degrees. We then calculated speech intelligibility of the reconstruction compared to the target and masker sentences, respectively, for all masker locations. The third simulation was designed to test the robustness of the engineering solution at low SNRs. In this last simulation, the target was fixed at 0° and the maskers fixed at ±90° respectively. The target-to-masker ratio (TMR), or the energy difference between the target and individual maskers, was then varied between −13 to 13 dB. This equates to signal-to-noise ratios (SNRs) of −16 to 10 dB. In all cases, stimulus direction was simulated by applying the Kemar HRTF of the desired location to the raw CRM sentences to generate realistic binaural signals with appropriate ITD and ILD cues. In both masked simulations, the randomly selected set of 20 trios of CRM sentences were used as described previously.

Measures of Reconstruction Quality and Segregation Performance.

We compared several objective measures of speech intelligibility and quality including the STOI, the Normalized Covariance Metric (NCM), and the PESQ, each of which calculates the intelligibility and quality of a processed signal compared to its original unprocessed form. A higher score indicates better intelligibility of the processed signal to human listeners. In our analyses, all three measures performed similarly and all corresponded well to the segregation performance of the model. We present only the STOI results here. The STOI is designed to measure the intelligibility of speech in the presence of added noise, which makes it an appropriate measure to quantify the quality of the reconstructed speech. Since the reconstructed signal is obtained by vocoding reconstructed envelopes, a perfect reconstruction would produce the vocoded version of the original signal. For this reason, we used the vocoded original signal as the reference signal in all intelligibility measures.

Frequency Tuning.

The model network we used assumes sharp frequency tuning, and one potential issue is that reconstruction quality may depend on frequency tuning width. For this reason, we explored the effects of frequency tuning curves on the network performance for single target reconstructions. We modeled the spread of information across frequency channels with a Gaussian-shaped weight function, centered around the center frequency (CF) of each frequency channel:

$$w_{i,j} = \exp\left(-\frac{(CF_j - CF_i)^2}{2\sigma_i^2}\right)$$

where i and j are the indices of frequency channels, and σ is the standard deviation. The spread of information is modeled by having the relay neurons centered at $CF_i$ receive inputs from its neighboring frequency channels, centered at $CF_j$, weighted by $w_{i,j}$. The values of $\sigma_i$ used in this simulation was determined by introducing the variable Q, defined as the ratio of CF to the full-width at half-maximum (FWHM) of a tuning curve. Here, we formulate Q in terms of the Gaussian weighing function's FWHM, which can then be related to $\sigma_i$:

$$Q = \frac{CF_i}{FWHM} = \frac{CF_i}{2\sqrt{.2\ln(2)}\sigma_i}.$$

We tested Qs ranging from Q=0.85 (broad tuning) to Q=23 (sharp tuning). For reference, Q values from field L in the zebra finch has been reported to range from 0.4 and 7.8. The performance of the network is quantified by the intelligibility of the reconstructed sentences, as measured by STOI.

Robustness to Frequency Tuning.

We processed 20 target sentences, placed at 0 deg azimuth, with our model network for Q ranging from 0.85 to 23. Performance of the model at each Q was evaluated by the intelligibility of the reconstructions with the targets alone, quantified by the STOI score (Table below). The reconstruction filters were calculated for each Q with the same training sentences previously described.

| Q | STOI | +/- |
|---|---|---|
| 0.8 | 0.3567 | 0.0536 |
| 1.3 | 0.4902 | 0.0425 |
| 2.5 | 0.593 | 0.0336 |
| 3.4 | 0.6459 | 0.0255 |
| 5.1 | 0.6671 | 0.027 |
| 7.6 | 0.6805 | 0.0241 |
| 10.6 | 0.6723 | 0.0254 |
| 23.4 | 0.6906 | 0.0243 |

Engineering Algorithms.

Although our main goal here was to develop a physiologically inspired model, we were curious to compare the segregation performance of the PA to cutting-edge engineering algorithms. Some engineering algorithms, notably beam-formers, rely on increasing the number of sound inputs with the number of sources, and/or rely on monaural features, such as pitch. In contrast, the PA is a binaural algorithm requiring only two inputs (left and right ear signals), as in the human auditory system, and does not use any additional information from monaural features. Thus, for a controlled comparison, we compared the segregation performance of the PA to two cutting-edge engineering algorithms that were essentially binaural: Model-Based Expectation-Maximization Source Separation and Localization (MESSL) and a deep neural network (DNN) trained with binaural cues, and evaluated all algorithms with the same STOI metric.

MESSL uses binaural cues to localize and separate multiple sound sources. Specifically, it uses a Gaussian mixture model to compute probabilistic spectrogram masks for sound segregation. For the best performance possible, the correct number of sound sources in each scenario was provided to the algorithm as a parameter. MESSL also requires a parameter tau, which is an array of possible source ITDs converted to numbers of samples. For this parameter, we used 0 to 800 μs of ITDs, and omitted the negative taps. MESSL does not require any training, but does require careful selection of these parameters to optimize performance.

DNN isolates a target sound from noisy backgrounds by constructing a mapping between a set of sound "features" and an ideal spectrogram mask. For a controlled comparison with the other algorithms, we replaced the monaural features in the DNN algorithm with three binaural features: ITD, ILD, and interaural cross-correlation coefficient (IACC). ITD was calculated through finding the peak location of the time-domain cross-correlation function, and the IACC was the peak value. To be consistent with the features used by certain DNN models, sixty-four frequency channels were used and the features were calculated for each time-frequency unit. We trained the DNN with sentences from the CRM corpus. Often, a critical factor in optimizing the performance of the DNN is the amount of training data used. The number of training sentences needed for the DNN performance to reach the highest performance under the second scenario described above was used to train the DNN.

Stimuli for Comparing Algorithms.

Sentences from the CRM corpus described above was used to form the speech stimuli for all three algorithms. The input sound mixtures had target-to-masker-ratios (TMRs) of unity (0 dB). TMR is defined as the sound level of the target to a single masker, regardless of the number of maskers present.

Scenarios.

Two scenarios were simulated for all three algorithms: In the first scenario, a target stimulus was placed at 0 degrees while two symmetrical maskers were varied between 0 and ±90 degrees. In the second scenario, a target stimulus was placed at 0 degrees while 2, 3, or 4 maskers were placed at ±45 and/or ±90 degrees in all possible combinations. The STOI score was then calculated for each condition. For MESSL and DNN, STOI was calculated by comparing the output of each simulation against each of the original individual stimuli.

Segregation Comparison.

In addition to comparing the segregation performance of the three algorithms by STOI value, we compared the change in intelligibility with respect to the target and with respect to the maskers, ΔSTOI. From ΔSTOI, we calculated the sensitivity index (d'), which represents the ease of detection of a target. It is defined by $$d' = (\mu_s - \mu_N) / \sqrt{\frac{1}{2}(\sigma_s^2 + \sigma_N^2)},$$

where it is the mean, a is the standard deviation, and S and N are the target and masker STOI scores, respectively. The higher the d', the more easily the target is detected. The sensitivity index d' allows easier comparison of the three algorithms' segregation abilities. Additionally, the output of the PA is noisy due to the stimulus reconstruction step, causing an artifact that is absent in MESSL and DNN. The use of the sensitivity index d' allows comparison of true segregation ability, independent of reconstruction artifact.

Algorithm Raining.

MESSL did not require any training. The amount of training versus performance for the DNN algorithm was determined experimentally using scenario 2. DNN required training on targets in the presence of maskers, with about 100 sentences required to reach peak performance, which was used to train the DNN algorithm in the simulations. The PA was trained on a concatenated sentence of approximately nine-second duration, composed of all keywords (names, colors, and numbers) from the CRM corpus, placed at 0 degrees. No additional training is required for novel stimulus locations.

Results

A Physiologically Inspired Algorithm for Solving the CPP.

We built upon the network model for cortical responses, as described above, to design a physiologically inspired algorithm (PA) to process human speech in a CPP-like setting (FIG. 9 panel A). The input to the PA was binaural speech input, corresponding to the sound signals at the left and right ears. The PA was composed of a cochlear filterbank, a midbrain spatial localization network, a cortical network and a stimulus reconstruction algorithm. The biological motivation and the computations carried out in each of these processing stages are described in detail in the Methods section, and a detailed figure for each stage of the model is illustrated in FIG. 2.

Performance.

The performance of PA is similar to the responses of cortical neurons in the avian auditory cortex. The monitor mode of the network is illustrated in FIG. 9 panel B. When a target alone was roved in space, the reconstructed signal resembled that target regardless of location, as demonstrated by the high short-time objective intelligibility (STOI) measure across all locations (FIG. 9 panel C). The similarity between the target and reconstructed waveforms is also visually illustrated in their spectrograms (FIG. 9 panel C, inset). Such encoding of single sources at all locations would allow the listener to broadly monitor the entire acoustic scene.

The selective mode of the network, in the presence of competing sounds, is illustrated in FIG. 9 panel D. For these simulations, the target was fixed at 0°, while two maskers of equal amplitude (0 TMR) were played simultaneously and symmetrically at angles anywhere between 0 and ±90 degrees. The PA was used to segregate and reconstruct the frontal target while suppressing the maskers. The STOI measure demonstrates that the PA is able to segregate the target signal effectively when the maskers are separated by more than about 15 degrees from the target (FIG. 9 panel E). The configuration of the network was not changed between the quiet (target alone) and noisy (target+masker) conditions, indicating the same network achieved both broad tuning to single targets and sharpened tuning in the presence of maskers.

Robustness.

We found that the PA remains effective in challenging situations where the intensity of the target source is weaker than the maskers. To demonstrate this robustness, we presented the target at 0°, and two maskers at ±90°, and varied the target to masker ratio (TMR). We found that the reconstructed signal more closely resembles the target than maskers down to about −5 dB, as reflected by higher STOI when comparing the reconstruction to the target vs. the maskers (FIG. 9 panel F).

Comparison with Human Psychophysics.

In psychoacoustics, the benefit of increased separation between target and masker has been termed spatial release from masking (SRM). Previous studies have recorded the TMR thresholds for 50% correct human performance in listening experiments with a center (0°) target and symmetrical maskers at different spatial separations. For comparison, we calculated the 50% classification threshold based on STOI for each target-masker separation. The 50% classification threshold for each separation was the TMR where the intelligibility measures (STOI) of the algorithm was higher compared to the target sentence than the masker sentences for at least 50% of sentences. FIG. 9 panel G compares the PA threshold TMRs to those measured for humans in psychoacoustic studies. The overall range and trend of performance of the PA was qualitatively similar to human performance.

Different Configurations of Cortical Network.

In the previous section, we simulated a frontal "beamformer" cortical network where the 0° azimuth frontal channel inhibits all other channels. The cortical network model can be configured to different spatial preferences by changing the cross-spatial-channel inhibitory connections. FIG. 10 demonstrates how changing the inhibitory connectivity of the cortical network while using the same mixed-source inputs changed the reconstructed signal. For these simulations, two sentences (S1 and S2) were presented simultaneously from the front (S1, 0° az) and right side (S2, 90° az). With cross-spatial-channel inhibition turned off, the reconstructed waveform resembled the mixture of the two sentences (FIG. 10 panel A). With a frontal beam-former network, the reconstructed waveform resembled the sentence in the front (FIG. 10 panel B). In this configuration, $STOI_{output,S1}=0.57$, while $STOI_{output,S2}=0.10$. With a different configuration of inhibitory connections as shown in the side beam-former network, the reconstructed waveform resembled the sentence on the side (90°) (FIG. 10 panel C). In this configuration, $STOI_{output,S1}=0.09$, and $STOI_{output,S2}=0.63$. Thus, depending on the configuration of the inhibitory connections, the network outputs resemble sound streams originating from specific spatial locations.

Comparison with Cutting-Edge Engineering Algorithms.

There have been intensive efforts to perform auditory source segregation using purely engineering algorithms. Although our main goal here was to develop a physiologically-based model, we were curious to compare the segregation performance of the PA to two cutting-edge engineering algorithms: Model-based Expectation Maximization Source Separation and Localization (MESSL) and a Deep Neural Network (DNN) trained with binaural cues; both were evaluated with STOI.

FIG. 11 panels A and B show the STOI curves for MESSL and DNN. Ideally, for good segregation, STOI values relative to the target should be as high as possible, while STOI values relative to the masker should be as low as possible. Target STOI were higher for the DNN and MESSL, compared to the PA model (FIG. 11 panels A and B, FIG. 9 panel D). However, the Masker STOI values were also higher for the DNN and MESSL, compared to the PA. Since STOI is designed to measure relative intelligibility, it alone is not a good measure of segregation. To quantify the segregation of the target and masker, we computed the difference in the STOI values ΔSTOI, as well as a discrimination index d' (see Methods). The PA had higher ΔSTOI and higher d' values compared to MESSL and DNN (FIG. 11 panels C and D).

Discussion

In the study, we developed a novel, physiologically inspired algorithm (PA) for processing sounds in a CPP-like setting. Our results demonstrate that, like cortical neurons in birds and mammals, the PA is capable of operating in two distinct modes. In the presence of single sounds, the algorithm reconstructs sounds across the entire azimuth, allowing the model to broadly monitor the acoustic space (FIG. 9 panel D). Such a behavior may also be important in complementing the visual system in detecting objects, when an object is outside of or in the periphery of the visual field. In the presence of multiple competing sounds, with cross-spatial channel inhibition in the cortical network, the algorithm is able to segregate a target sound from sound mixtures, allowing the network to selectively listen to a target (FIG. 9 panel E). Note that switching between the two modes only requires the presence or absence of a competing sound, not a reconfiguration of the cortical network. The PA is robust to the level of the masker relative to the target (FIG. 9 panel F), and displays trends similar to human performance (FIG. 9 panel G). The flexible behavior of the PA reflects every-day behavior of humans and animals, but this important feature is non-existent in current sound-processing technologies. Thus, the PA, the first physiologically-based algorithm to exploit binaural spatial cues to solve the CPP and displays flexible behavior, may help improve the performance of a broad range of sound processing systems and devices that have difficulty under CPP-like conditions.

Our model is a synthesis of multiple stages of auditory processing that are based in physiological understanding of birds. The spatial localization network was based the barn-owl's midbrain, one of the best understood model systems for spatial localization. The cortical level was based on experimental recordings from field L, the analogue of primary auditory cortex, in the zebra finch. Although the cortical level in birds is structurally different from the mammalian cortex, recent studies have shown that the functional properties of auditory neurons in field L are remarkably similar to mammalian cortex. The spatial responses of field L neurons, is also similar to neural responses in the primary auditory cortex of cats, which showed broad spatial tuning for single sound sources, but sharper spatial tuning in the presence of two competing auditory streams from different locations. Therefore, it is possible that the mechanisms in the avian-based PA model also exist in mammals. We are currently conducting experiments in mice to determine whether the A1 neurons also display flexible tuning behavior.

Effects of Spatial Tuning Width and Frequency Tuning Width.

The model as implemented here relies on tuned responses to both spatial location and frequency. A previous study have investigated the effect of sharpness of spatial tuning in a similar network model and found that the performance of the network remained robust over a broad range of spatial tuning widths. Specifically, for tuning curves modeled as Gaussians, performance was robust for tuning curve widths (i.e., twice the standard deviation) ranging from less than 15° up to 80°.

In mammalian systems, spatial tuning curves for single locations have been found to be broadly tuned "open-ended" response functions, e.g., a sigmoidal function of location, instead of the spatially tuned channels employed in our model, experimentally observed in avian species. Computational modeling shows that it is possible to construct accurate readouts for spatial location either using sharply tuned circumscribed receptive field (e.g., Gaussian) or broadly tuned "open-ended" response pattern (e.g., a sigmoid). Thus, the readout computation for spatial location for single sound sources may be different in birds and mammals. However, once the readout for single locations has been achieved, cross-spatial-channel inhibition could be used as described in our model, to achieve hotspots on the spatial grid. Our preliminary data, using a very similar experimental paradigm have revealed similar spatial grids in the mouse. This suggests that despite potential differences in readouts for single sounds, avian and mammalian species may show similar cortical representations for sound mixtures.

To evaluate the effect of frequency tuning widths on reconstructed outputs, we simulated cortical networks with gradually increasing cross-frequency connectivity profiles (see Methods), which would broaden the effective frequency tuning widths of individual channels, and evaluated the performance of our model for capturing a single target sentence placed at 0 deg azimuth. We found that performance of our model network remained robust over a range of connectivity widths (Q factors 23.5-3.5) and degraded for lower values (Table 1). The range of Q values over which performance remained robust contains values similar to those observed in the avian auditory cortex, suggesting that physiologically observed values for frequency tuning width can support robust stimulus reconstruction.

In our model, some of the critical components of the overall computation, e.g., peripheral filtering of sounds and spatial localization using acoustic cues such as ITD and ILD, occur prior to the cortical level, supporting the idea that bottom-up processing plays an important role in separating auditory mixtures into different spatial streams. The cortical level then builds on these computations to select appropriate stream(s) to attend. The brain combines both bottom-up and top-down processes to solve the CPP. Modeling top-down processes would be an appropriate next step in extending our model.

Relating to Visual System

In the cortical network employed here, cross-spatial-channel inhibition plays an important role, with the inhibition being recruited when multiple competing objects are simultaneously present at different locations. This is reminiscent of an interesting finding in the primary visual cortex, where simultaneously stimulating the classical and the non-classical receptive field of a visual cortical neuron increases the sparseness, reliability and precision of neuronal responses, by recruiting strong "cross-channel" inhibition. Thus, similar inhibitory cortical circuitry may be involved in processing complex scenes in the auditory and visual cortex. Unlike primary auditory cortical neurons, primary visual cortical neurons have much more spatially localized receptive fields. However, the size of spatial receptive fields in downstream visual areas thought to be involved in object recognition, e.g., inferotemporal cortex (IT), are much larger. Interestingly, when a second stimulus is presented in the visual receptive field of IT neurons, neurons can be suppressed by or tolerant to the second stimulus. It would be interesting to probe whether the relative spatial locations of the simultaneous stimuli affect such responses. The problem of detecting, selecting and processing particular objects in a cluttered scene with multiple objects is also faced by the visual system. The principle of the PA could be applied to such a problem by allowing inhibitory neurons with spatial receptive fields containing a target object to suppress the responses of excitatory neurons with receptive fields in other spatial locations.

Comparison with Engineering Algorithms.

We compared the PA to two other algorithms that also use binaural cues to perform sound segregation—MESSL and DNN. Although all three algorithms were binaural, some differences are worth noting. We found that the DNN required significantly more training than the PA. It is unknown how well the DNN generalizes to different target and masker locations after training, whereas the PA can be configured to varying spatial configurations of target and maskers by adjusting the inhibitory connectivity in the cortical network, without further training (FIG. 9). One advantage of the MESSL algorithm is that it did not require any training; however, it was the most sensitive of all the algorithms to increasing number of maskers. It also required an initial estimation of the number of sources present to accurately separate a sound mixture, making it difficult to implement in real-world settings. Another important distinction between the algorithms is that the PA is rooted in physiology, whereas MESSL and DNN are not. The cortical network architecture enables the PA to be used as a predictive tool to motivate new experiments in neuroscience, and novel experimental findings can be incorporated into the PA.

The comparison shown in the results is intended as an additional step in evaluating the PA's performance, not as a full benchmarking, which is outside the scope of this study. Aside from constraining all the algorithms to be "binaural-only", we did not change the model structure or the parameters for MESSL and DNN (see Methods). Thus, it is possible that the relative performance of these algorithms could be improved further by adjusting their parameter values, or operating on different kind of sound mixtures. Nevertheless, our results demonstrate that the segregation performance of the PA is similar to that of state-of-the-art engineering algorithms, and motivates further exploration of the PA as a novel and competitive approach for processing sounds in CPP-like settings.

While various embodiments of the invention have been particularly shown and described, it will be understood by those skilled in the art that various changes in form and details may be made therein without departing from the scope of the invention as defined by the appended claims.

What is claimed is:

1. An auditory signal processor, comprising:
    a filter bank configured and operative to generate a plurality of frequency components of a source audio signal;
    a spatial localization network configured and operative in response to the frequency components to generate a plurality of spike trains for respective spatially separated components of the source audio signal;
    a cortical network configured and operative in response to the spike trains to generate a resultant spike train for selected spatially separated components of the source audio signal; and
    a stimulus reconstruction circuit configured and operative to process the resultant spike train to generate a reconstructed audio signal for a target component of the source audio signal,
    wherein (1) the cortical network incorporates top-down attentional inhibitory modulation of respective spatial channels to produce the resultant spike train for the selected spatially separate components of the source audio signal, and (2) the stimulus reconstruction circuit employs convolution of a reconstruction kernel with the resultant spike train to generate the reconstructed audio signal.

2. The auditory signal processor of claim 1, wherein the convolution produces a time-frequency spike mask that is further processed to produce the reconstructed audio signal.

3. The auditory signal processor of claim 2, wherein the further processing includes direct voice coding of the time-frequency spike mask to produce the reconstructed audio signal.

4. The auditory signal processor of claim 2, wherein the further processing includes applying the time-frequency spike mask to the frequency components from the filter bank to produce the reconstructed audio signal.

5. The auditory signal processor of claim 2, wherein the further processing includes applying the time-frequency spike mask to an extracted envelope of the frequency components from the filter bank to produce the reconstructed audio signal.

6. The auditory signal processor of claim 1, wherein the top-down attentional inhibitory modulation is performed by structure including:
    relay neuron elements selectively relaying corresponding spatial-channel inputs to an output element in the absence of respective first inhibitory inputs;
    bottom-up inhibitory neuron elements selectively generating the first inhibitory inputs to corresponding relay neuron elements based on the absence of respective second inhibitory inputs; and
    top-down inhibitory neuron elements selectively generating the second inhibitory inputs to corresponding sets of the bottom-up inhibitory neuron elements to cause selection of a corresponding set of spatial-channel inputs to the output element.

7. An auditory device, comprising:
    audio input circuitry for receiving or generating a source audio signal;
    an auditory signal processor to produce a reconstructed audio signal for a target component of the source audio signal; and
    output circuitry to produce an output from the reconstructed audio signal, wherein the auditory signal processor includes:
- a filter bank configured and operative to generate a plurality of frequency components of the source audio signal;
- a spatial localization network configured and operative in response to the frequency components to generate a plurality of spike trains for respective spatially separated components of the source audio signal;
- a cortical network configured and operative in response to the spike trains to generate a resultant spike train for selected spatially separated components of the source audio signal; and
- a stimulus reconstruction circuit configured and operative to process the resultant spike train to generate the reconstructed audio signal for a target component of the source audio signal,
- wherein (1) the cortical network incorporates top-down attentional inhibitory modulation of respective spatial channels to produce the resultant spike train for the selected spatially separate components of the source audio signal, and (2) the stimulus reconstruction circuit employs convolution of a reconstruction kernel with the resultant spike train to generate the reconstructed audio signal.

8. The auditory device of claim 7, wherein the auditory signal processor is configured to receive user input to generate corresponding control for the top-down attentional inhibitory modulation.

9. The auditory device of claim 7, wherein the convolution of the auditory signal processor produces a time-frequency spike mask that is further processed to produce the reconstructed audio signal.

10. The auditory device of claim 9, wherein the further processing of the auditory signal processor includes direct voice coding of the time-frequency spike mask to produce the reconstructed audio signal.

11. The auditory device of claim 9, wherein the further processing of the auditory signal processor includes applying the time-frequency spike mask to the frequency components from the filter bank to produce the reconstructed audio signal.

12. The auditory device of claim 9, wherein the further processing of the auditory signal processor includes applying the time-frequency spike mask to an extracted envelope of the frequency components from the filter bank to produce the reconstructed audio signal.

13. The auditory device of claim 7, wherein the top-down attentional inhibitory modulation of the auditory signal processor is performed by structure including:
- relay neuron elements selectively relaying corresponding spatial-channel inputs to an output element in the absence of respective first inhibitory inputs;
- bottom-up inhibitory neuron elements selectively generating the first inhibitory inputs to corresponding relay neuron elements based on the absence of respective second inhibitory inputs; and
- top-down inhibitory neuron elements selectively generating the second inhibitory inputs to corresponding sets of the bottom-up inhibitory neuron elements to cause selection of a corresponding set of spatial-channel inputs to the output element.

14. The auditory device of claim 7, wherein audio input circuitry include one or more pairs of microphones.

15. The auditory device of claim 7, wherein the output circuitry includes an output transducer operative to generate an acoustic audio output signal.

16. The auditory device of claim 7, wherein the source audio signal includes multiple-channel audio or video recordings for which a spatial configuration of recording microphones is known.

17. The auditory device of claim 7, wherein the output is transcribed into text using voice-to-text technology.

* * * * *